United States Patent [19]

Iiskola et al.

[11] Patent Number: 5,360,776
[45] Date of Patent: Nov. 1, 1994

[54] STEREOSELECTIVE CATALYST FOR THE POLYMERIZATION OF OLEFINS

[75] Inventors: Eero Iiskola, Porvoo; Rauha Huurinainen, Hamari, both of Finland

[73] Assignee: Neste Oy, Kulloo, Finland

[21] Appl. No.: 120,855

[22] Filed: Sep. 15, 1993

Related U.S. Application Data

[63] Continuation of Ser. No. 785,571, Oct. 30, 1991, abandoned.

[30] Foreign Application Priority Data

Nov. 7, 1990 [FI] Finland ................... 905523

[51] Int. Cl.$^5$ ............ C08F 4/654; C08F 10/06
[52] U.S. Cl. ............... 502/111; 502/127; 526/125; 526/351
[58] Field of Search ................... 502/111, 127

[56] References Cited

U.S. PATENT DOCUMENTS

| | | | |
|---|---|---|---|
| 4,329,253 | 5/1982 | Goodall et al. | 526/125 |
| 4,473,660 | 9/1984 | Albizzati et al. | 526/125 |
| 4,761,461 | 8/1988 | Jaggard et al. | |
| 4,816,433 | 3/1989 | Terano et al. | |
| 4,829,034 | 5/1989 | Iiskolan et al. | 302/9 |
| 4,952,649 | 8/1990 | Kioka et al. | 526/124 |

FOREIGN PATENT DOCUMENTS

| | | |
|---|---|---|
| 45977 | 2/1982 | European Pat. Off. . |
| 0282341 | 9/1988 | European Pat. Off. . |
| 62-4705 | 1/1987 | Japan ........... 526/125 |
| 2099004 | 12/1982 | United Kingdom . |

OTHER PUBLICATIONS

Search Report (w/English-language translation).

Primary Examiner—Edward J. Smith
Attorney, Agent, or Firm—Armstrong, Westerman, Hattori, McLeland & Naughton

[57] ABSTRACT

In the invention a procatalyst of a catalyst system of a new type intended for the polymerization of olefins has been prepared comprising a carrier based on a magnesium compound, a titanium compound and a dialkylester of phthalic acid. The most important properties of this kind of a procatalyst are the high stereoselectivity and the high activity. Now it has been possible to increase the activity considerably by using a different kind of dialkylester of phthalic acid having in its alkyl 9 to 20 carbon atoms and the dielectricity constant of which being preferably below 5 measured at 25 C.

8 Claims, 4 Drawing Sheets

STEREOSELECTIVE CATALYST FOR THE POLYMERIZATION OF OLEFINS

This application is a continuation of application Ser. No. 07/785,571 filed Oct. 30, 1991 abandoned.

BACKGROUND OF THE INVENTION

1. Technical Field

The invention relates to a procatalyst of a catalyst system intended for the polymerization of olefins comprising a magnesiumhalide-containing carrier, a titanium compound and a dialkylester of phthalic acid. The invention also relates to a method for the preparation of a procatalyst of a catalyst system intended for polymerization of olefins, in which a magnesiumhalide-containing carrier is brought into contact with a titanium compound and a dialkylester of phthalic acid. The invention also relates to the use of a procatalyst of the above-mentioned type together with an organometallic cocatalyst for the preparation of polypropylene.

2. Description of the Related Art

In general a Ziegler-Natta catalyst system is used for the polymerization of olefins, which system consists of a so-called procatalyst and a cocatalyst. The procatalyst is based on a compound of a transition metal belonging to any of the groups IVA to VIII of the periodic table and the cocatalyst is based on an organometallic compound of a metal belonging to any of the groups IA to III(B) of the periodic table (the groups are marked according to Hubbard, see e.g. L. Römpp, 8th Edition, p. 3051).

Generally, to a catalyst system also belongs electron donor compounds improving and modifying the catalytic properties. When stereoselective, high-yield Ziegler-Natta catalysts on solid magnesium compound carrier are prepared organic mono-and diesters are widely used to improve the stereoselectivity of the catalyst. In co-ordination polymerization chemistry these esters are often characterized as internal electron donors.

Of organic diesters the best known in the field are the diesters of phthalic acid. Such alkylphthalates have been presented e.g. in the following publications: EP-268,685 A1, EP-250,244 A2, EP-45,975 A2, EP-86,643 A2, EP-16,141 A1, EP45,977 B1, EP-267,576 A2, EP-206,172 A1, EP-256,865 A1, and EP-261,961 A2. In previous patents the most useful electron donors have been the n-butyl or di-isobutylesteracid of 1,2-benzenecarboxylic acid.

By using alkyl esters of phthalic acid as the electron donor component of the procatalyst of a catalyst system intended for the polymerization of olefins the aim has been to achieve an as stereoselective and high yield catalyst as possible. The improvement of this property is the goal also in the present invention.

SUMMARY OF THE INVENTION

The high yield and the stereoselectivity of a polymerization catalyst have been successfully combined in the present invention by giving to the procatalyst of the catalyst system the characteristics which have been disclosed in the claims. Respectively, the characteristics which have been presented in the claims have been given to the method for preparing the procatalyst of the polymerization catalyst system. Unexpectedly, it has also been noted that the catalyst according to the invention is perfect for the preparation of polypropylene having a prescribed molecular weight distribution.

DETAILED DESCRIPTION OF THE INVENTION

Figure 1:
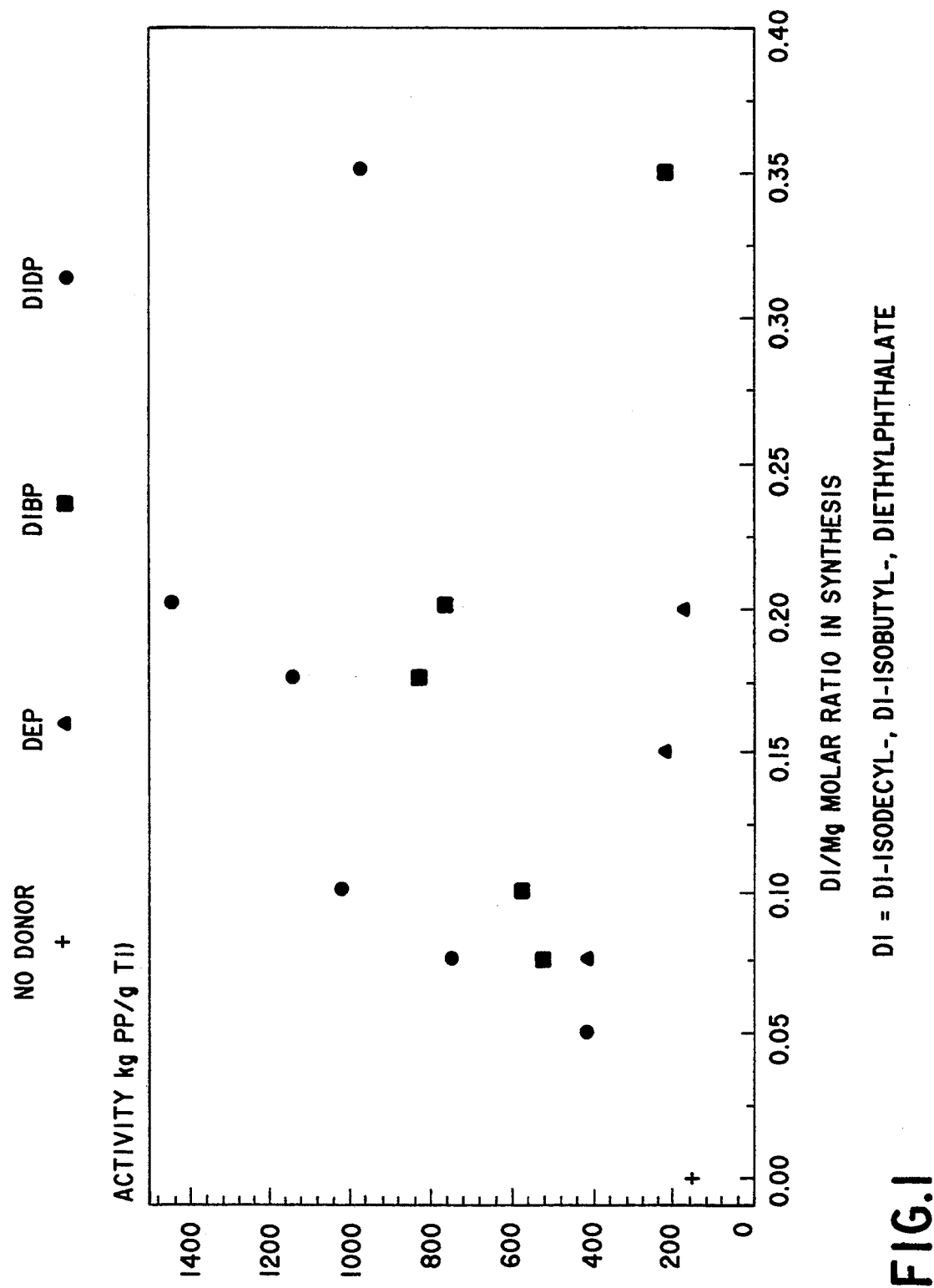
FIG. 1 is a graph which depicts the influence of the used phthalate D1 and the molar ratio D1/Mg on the activity of the catalyst.

The carrier component based on the magnesium compound of the procatalyst can be any hydroxy-, alkoxy-, and/or halide-containing magnesium compound, such as $Mg(OH)Cl$ $Mg(OH)_2$, $Mg(OR)_2$, or $MgCl_2$. Of these compounds magnesium dichloride is particularly preferable.

The titanium compound on the carrier can be e.g. titanium alkoxide, a titanium alkoxide halide, or a titanium halide. A particularly preferable titanium compound is titanium tetrachloride $TiCl_4$.

The procatalyst donor i.e. the internal donor of the catalyst system is a dialkyl ester of phthalic acid, the alkyl of which has from 9 to 20 carbon atoms. It has, in fact, been noted that such a long-chained electron donor is unexpectedly usable when a stereoselective Ziegler-Natta-catalyst is being prepared. It is also preferable that the dielectricity constant of such a phthalic acid-di-$C_9$-$C_{20}$-alkylester is below 5 measured at 25° C.

Typical internal electron donors used in the present invention are di-isodecyl phthalate and di-tridecyl phthalate. A particularly preferable internal electron donor is di-isodecyl phthalate.

The use of phthalate esters of this kind having long alcohol chains and a low dielectric constant has the following advantages: a very high activity, an excellent stereoselectivity, selectivity a very low toxic effect in the catalyst synthesis, a very good catalyst synthesis reproducibility, and a low titanium content. As the molar ratio between the dialkylester of phthalic acid and the magnesium compound can be greatly varied without the activity decreasing, the quality of the catalyst can be better controlled when the scale of the catalyst system is enlarged.

The invention also relates to a method for the preparation of a procatalyst of a catalyst system intended for the polymerization of olefins. In the method the carrier based on a magnesium compound is brought into contact with a titanium compound and a dialkyl ester of phthalic acid.

Although the selection of the magnesium compound is not critical for carrying out the invention successfully, in the synthesis, a carrier starting material based on a magnesium compound is preferably used, which is a particulate complex of magnesium chloride and an alcohol, such as ethanol. Particularly preferable is a solid complex with a spherical type of particles having the formula $MgCl_2 \cdot 3C_2H_5OH$. Such a carrier starting material and its preparation is known e.g. from our U.S.

Pat. No. 4,829,034, which is hereby included by reference.

When a carrier of the above-mentioned type is brought into contact with a titanium compound and an electron donor, they deposit in layers on the carrier forming an active and stereoselective procatalyst. Hereby, at least a part of the complexed alcohol is released.

As mentioned when the product according to the present invention was dealt with, titanium compounds containing alkoxy and/or halogen can be used as the titanium compound, whereby the most preferable is titaniumtetrachloride, $TiCl_{14}$.

Characteristic of the method according to the invention is that the dialkylester of phthalic acid, the alkyl of which has from 9 to 20 carbon atoms, is used as the internal donor. It is preferable to use as an electron donor of this kind, whose dielectric constant measured at 25° C. is below 5. In the synthesis e.g. di-isodecyl phthalate or di-tridecyl phthalate can be used, preferably di-isodecyl phthalate.

As was mentioned above the activity of the catalyst is large even within a wide concentration range of the phthalic acid dialkylester. In the synthesis alternating amounts of phthalic acid dialkylester can thus be used, whereby the molar ratio between it and the magnesium is between 0.05 and 0.50 and preferably between 0.10 and 0.35.

Another significant idea connected with the use of long-chained dialkylesters of phthalic acid as internal donors is that the molecular weight distribution of polypropylene i.e. the polydispersity can be controlled by means of the portion of the dialkylester of phthalic acid in the preparation of the catalyst. In this manner a polydispersity in the range from 6 to 10 has been achieved when di-isodecyl phthalate has been used as an internal donor. Be it mentioned that when di-isobutyl phthalate according to the prior art is used in the catalyst synthesis the polydispersity is between 5 and 6 and cannot be changed by varying the molar ratio between isobutyl phthalate and magnesium. The high polydispersity i.e. the wide molecular weight distribution of the polypropylene prepared makes it a suitable material for the preparation of polypropylene film.

In the following the invention is illustrated by some examples which are also accompanied by some tables and a figure.

EXAMPLE 1

The activation of the $MgCl_2 \cdot 3EtOH$-carrier was carried out as follows: 24.5 g of the above-mentioned carrier was added at a temperature of $-10°$ C. to a vessel containing 150 ml of heptane and 300 ml of $TiCl_4$. The carrier was allowed to react, whereby the temperature was simultaneously slowly raised to $+20°$ C. under simultaneous agitation. At a temperature of $+20°$ C. 9.7 ml of di-isodecyl phthalate (DIDP), corresponding to a DIDP/Mg molar ratio of 0.2, was added and the temperature was during in 90 minutes raised to $+110°$ C. and maintained there for 60 minutes. The treatment was repeated with 300 ml of $TiCl_4$ at a temperature of $+120°$ C. for 120 minutes. The product was washed with 300 ml of heptane at a temperature of $+80°$ C. for 20 minutes. The washing was repeated 5 times and the product thus obtained was dried in hydrogen flow at room temperature. The colour of the dried catalyst was greenish brown. The analytical results of the catalysts were: Ti 1.3% by weight, Mg 14.7% by weight, Cl 46.9% by weight, di-isodecyl phthalate 9.0% by weight, heptane 28.1% by weight. The polymerization was carried out in a two-liter autoclave by using 900 ml of heptane as an intermediate medium with the following parameters:

| $P(C_3H_6) = 7$ bars | $AlEt_3$, 5 mmols; Al/Ti = 737 |
| $P(H_2) = 0.3$ bars | Al/donor = 20 |
| T = +70° C. | Catalyst amount = 25.0 mg |
| t = 4h | |

As the cocatalyst was used triethylaluminum and as the electron donor cyclohexylmethyldimethoxysilane. The activity of the catalyst was 1444 kg of polypropylene per g of titanium and 26.1 kg of polypropylene per g of dry catalyst. The evaporation residue obtained from the polymerization liquid formed 0.6% by weight of the whole recovered polypropylene amount. The isotacticity of the polypropylene was 97.6%, the isotacticity index 97% and the specific density 0.37 g/cm$^3$. The melt index was 4.1 g/10 minutes and the polydispersity 6.4.

EXAMPLE 2 to 6

The catalyst was prepared exactly in the same way as in example 1 by using the above-mentioned carrier, but now the DIDP/Mg molar ratios were correspondingly 0.05; 0.075; 0.1; 0.175; and 0.35. The analytical results are presented in table 1.

The polypropylene was prepared by polymerizing in the same way as in Example 1 (25.0 mg of catalyst, 5 mmol of $AlEt_3$ and the Al/electron donor molar ratio was 20). The polymerization results are presented in Table 2.

Comparison Example A

The catalyst was prepared exactly in the same manner as in Example 1 by using the same carrier, but phthalate diester was not used. The analytical results of the catalyst were: Ti 7.2% by weight; Mg 14.2% by weight; Cl 57.2% by weight; heptane 21.4% by weight.

The propylene was polymerized in the same way as in Example 1. The activity of the catalyst was 149 kg per g of titanium. The evaporation residue of the polymerization liquid was 15.3% by weight calculated from the polypropylene amount obtained. The isotacticity of the polypropylene was 91.7% by weight, and the isotacticity index 77.7%. The specific density was not measured, for the polymer was sticky due to its amorphous portion. The melt index of the polymer was 3.0 g/10 minutes.

Comparison Example B

The catalyst was prepared exactly in the same manner as in Example 1 by using the same carrier, but instead of di-isodecyl phthalate 5.6 ml of di-isobutyl phthalate (DIBP) was used. The DIBP/Mg molar ratio was 0.2. The analytical results of the catalyst were: Ti 2.1% by weight; Mg 15.8% by weight; Cl 52.1% by weight; di-isobutylphthalate 15.8% by weight, heptane 14.2% by weight.

The propylene was polymerized in the same way as in Example 1.

The activity of the catalyst was 760 kg of polypropylene as per g of titanium and 18.6 kg of polypropylene per g of catalyst. The evaporation residue of the polymerization liquid was 0.7% by weight from the polypropylene amount produced. The isotacticity of the polypropylene was 97.9% by weight, the isotacticity index 97.2% and the relative density 0.48 g/cm³. The melt index of the polymer was 5.1 g/10 minutes and the polydispersity 5.9.

Comparison Examples C, D, E, and F

The catalyst was prepared exactly in the same manner as in Example 1 using the above-mentioned carrier, but now the DIBP/Mg molar ratios were in the syntheses correspondingly 0.075, 0.1, 0.175 and 0.35. The analytical results of the catalysts are presented in Table 1.

The propylene was polymerized in the same manner as in Example 1. The polymerization results are presented in Table 2.

Comparison Example G, H, and I

The catalyst was prepared exactly in the same manner as in Example 1 using the above-mentioned carrier, but now instead of the DIBP diethylphthalate (DEP) was used. The DEP/Mg molar ratios were correspondingly 0.075, 0.15, and 0.2.

The propylene was polymerized in the same manner as in Example 1. The analytical results of the catalysts are presented in Table 1. The polymerization results are presented in Table 2.

TABLE 1

The amount and the type of the electron donor used in the synthesis and the analytical consistency of the catalyst obtained

| Example No. | Donor/Mg-molar ratio | Donor added ml | Ti | Mg | Cl | Donor | Heptane |
|---|---|---|---|---|---|---|---|
| 2 | 0.05 | DIDP 2.4 | 3.3 | 14.2 | 52.6 | 7.8 | 22.1 |
| 3 | 0.075 | DIDP 3.6 | 2.5 | 13.6 | 45.5 | 9.3 | 29.1 |
| 4 | 0.1 | DIDP 4.8 | 1.4 | 14.6 | 45.4 | 9.7 | 28.9 |
| 5 | 0.175 | DIDP 8.5 | 1.6 | 16.0 | 49.2 | 10.1 | 23.1 |
| 6 | 0.35 | DIDP 17.0 | 1.6 | 16.4 | 54.3 | 8.8 | 18.9 |
| comp. ex. C | 0.075 | DIBP 2.1 | 3.0 | 15.3 | 52.6 | 8.8 | 20.3 |
| comp. ex. D | 0.1 | DIBP 2.8 | 2.6 | 14.6 | 51.5 | 9.8 | 21.5 |
| comp. ex. E | 0.175 | DIBP 4.9 | 1.8 | 14.7 | 49.2 | 12.3 | 22.0 |
| comp. ex. F | 0.35 | DIBP 9.8 | 4.8 | 10.8 | 45.1 | 28.0 | 11.3 |
| comp. ex. G | 0.075 | DEP 1.6 | 3.0 | 13.1 | 47.2 | 8.8 | 27.9 |
| comp. ex. H | 0.15 | DEP 3.2 | 3.4 | 14.4 | 51.7 | 19.7 | 10.8 |
| comp. ex. I | 0.2 | DEP 4.2 | 3.9 | 13.2 | 50.1 | 23.8 | 9.0 |

TABLE 2

The performance of the catalyst in the slurry polymerization of propylene

| Example No. | Active kg PP/g Ti | Active kg PP/g dry catalyst | Isotacticity/evap. residue (%) | I.I. (%) | B.D. | M.I. | D |
|---|---|---|---|---|---|---|---|
| 2 | 418 | 17.7 | 94.7/5.5 | 89.5 | 0.43 | 2.2 | 9.6 |
| 3 | 750 | 18.8 | 97.2/1.6 | 95.6 | 0.47 | 5.8 | 8.8 |
| 4 | 1021 | 20.1 | 97.7/1.1 | 96.6 | 0.47 | 4.7 | 7.2 |
| 5 | 1138 | 23.7 | 98.0/0.8 | 97.2 | 0.42 | 4.2 | nm |
| 6 | 975 | 19.3 | 99.3/0.7 | 98.6 | 0.37 | 1.6 | nm |
| comp. ex. C | 523 | 19.7 | 97.6/1.5 | 96.1 | 0.47 | 3.1 | 6.1 |
| comp. ex. D | 573 | 19.0 | 98.8/1.1 | 97.1 | 0.48 | 3.4 | nm |
| comp. ex. E | 822 | 18.9 | 97.1/0.5 | 96.6 | 0.47 | 4.9 | 5.8 |
| comp. ex. F | 223 | 12.1 | 99.3/0.7 | 98.6 | 0.48 | 9.9 | nm |
| comp. ex. G | 420 | 17.5 | 98.7/0.8 | 97.9 | 0.48 | nm | nm |
| comp. ex. H | 224 | 8.5 | 99.0/0.9 | 98.1 | 0.47 | nm | nm |
| comp. ex. I | 177 | 7.6 | 97.7/0.2 | 97.5 | 0.47 | nm | nm | nm = not measured

FIG. 1 depicts the influence of the used phthalate D1 and the molar ratio D1/Mg on the activity of the catalyst.

Figure 2:
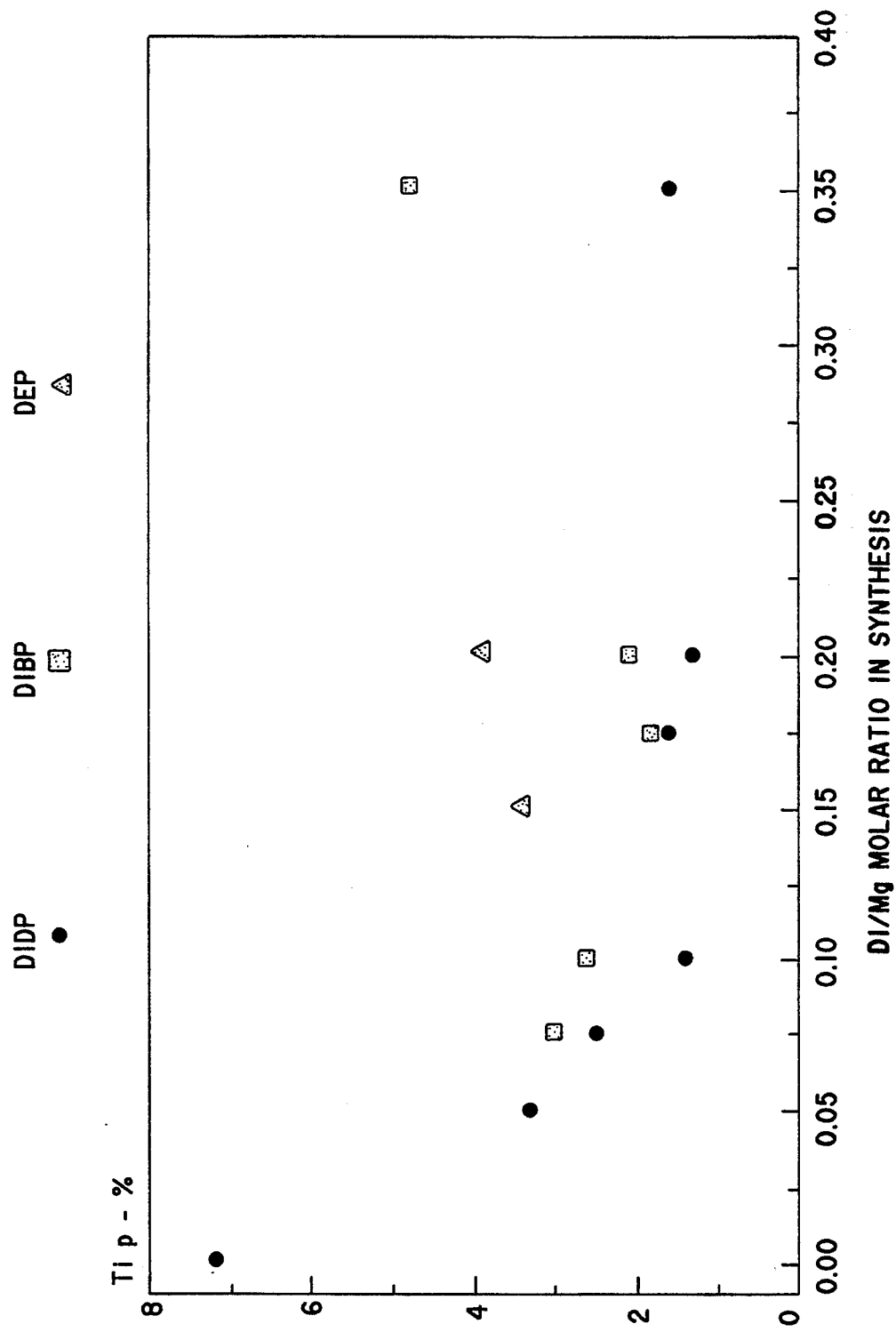
FIG. 2 is a graph which depicts the influence of the used phthalate D1 and the molar ratio D1/Mg on the Ti-content of the catalyst.

FIG. 2 depicts the influence of the used phthalate D1 and the molar ratio D1/Mg on the Ti-content of the catalyst.

Figure 3:
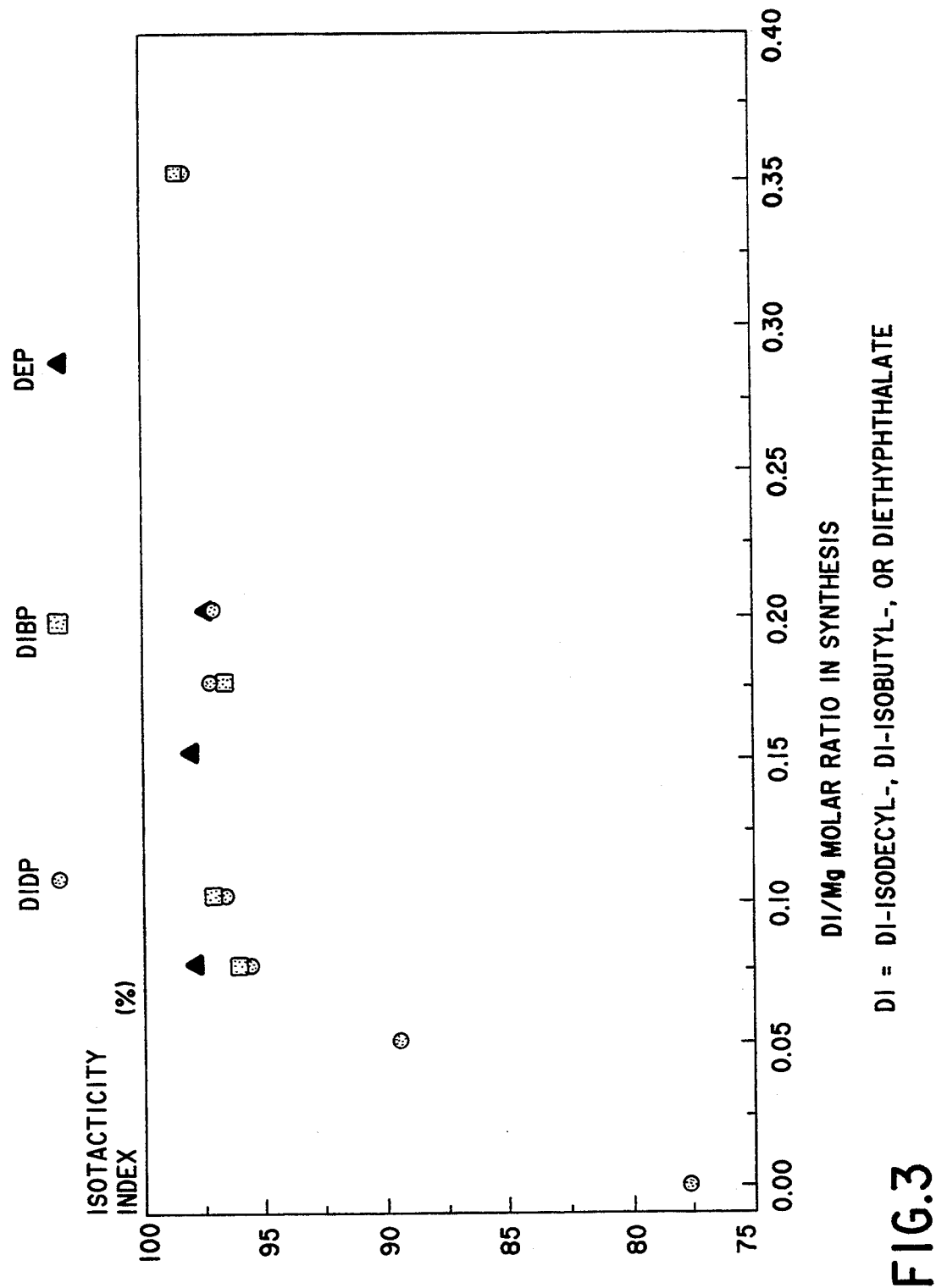
FIG. 3 is a graph which depicts the influence of the used phthalate D1 and the molar ration D1/Mg on the isotacticity index of polypropylene.

FIG. 3 depicts the influence of the used phthalate D1 and the molar ratio D1/Mg on the isotacticity index of polypropylene.

Figure 4:
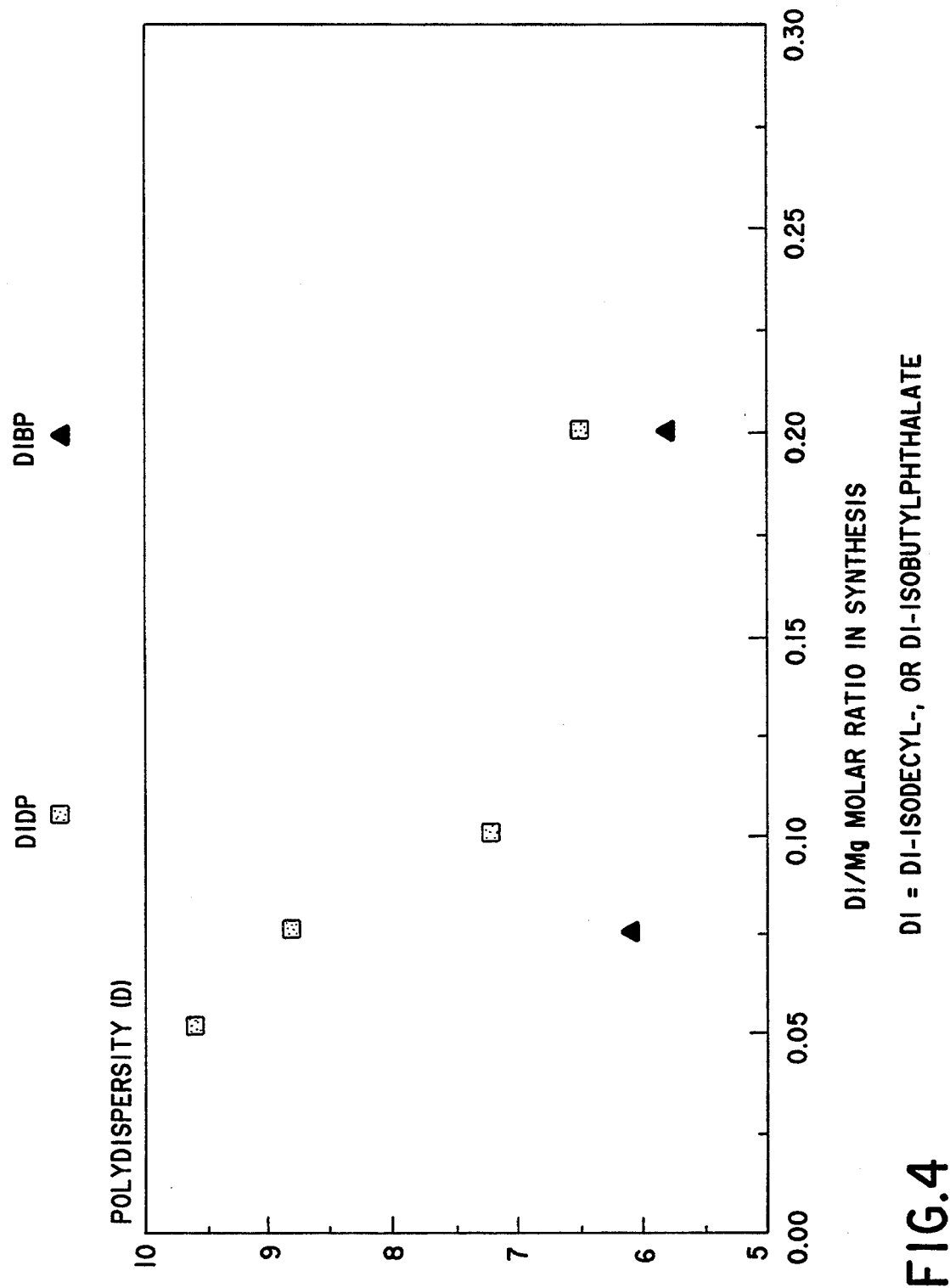
FIG. 4 is a graph which depicts the influence of the used phthalate D1 and the molar ratio on D1/Mg on the polydispersity of polypropylene.

FIG. 4 depicts the influence of the used phthalate D1 and the molar ratio D1/Mg on the polydispersity of polypropylene.

The tables show that the catalytic activity is greatly dependent on the phthalic acid dialkylester used in the catalyst synthesis and the molar ratio between the ester and magnesium. This appears still better from FIG. 1, where the activity of the catalyst expressed as kilograms of polypropylene per gram of titanium has been given for various donors as a function of the molar ratio of the donor and magnesium. In the same time as we can see that the di-isodecyl phthalate according to the invention is superior as an internal donor, FIG. 1 also shows that its molar ratio to magnesium does not as easily influence the activity of the catalyst as does the molar ratio between the dialkyl phthalates according to the prior art and magnesium.

The titanium content of the catalyst is almost constant at a large isodecyl phthalate/Mg molar ratio range, whereby the average titanium content is 1.5% by weight. While it is a general endeavour in the field to decrease the metal amount in a polymer and thus also in the catalyst, FIG. 2 clearly shows that di-isodecyl phthalate is an efficient decreaser of the titanium content of the catalyst.

In FIG. 3 the influence of the molar ratio between the internal donor and magnesium on the isotacticity index of polypropylene has been presented. There is no difference between the three different internal donors as far as the isotacticity index of polypropylene is concerned, from which follows that with the internal donors according to the invention primarily greater activities in regard to the prior art are achieved with the same isotacticity indices. When the di-isodecyl phthalate according to the invention is used as an internal donor polypropylene was obtained whose polydispersity was between 6 and 10. When di-isobutyl phthalate is used in the preparation of a catalyst the polydispersity is between 5 and 6 and it cannot be changed by alternating the di-isobutyl phthalate/Mg molar ratio. This effect clearly appears from FIG. 4.

We claim:

1. A procatalyst of catalyst system intended for the polymerization of olefins comprising a carrier based on a magnesium compound which is a particulate complex of magnesium chloride and ethanol, titanium tetrachloride and a dialkylester of phthalic acid, characterized in that the dialkylester of the phthalic acid is di-isodecyl phthalate and the molar ratio between the dialkylester of phthalic acid and magnesium is between 0.10 and 0.35.

2. A procatalyst according to claim 1, characterized in that the dielectricity constant of the dialkylester of phthalic acid is below 5 measured at 25° C.

3. A procatalyst according to claim 1 or 2, characterized in that the carrier based on a magnesium compound is magnesium dichloride.

4. A procatalyst according to claim 1, wherein the magnesium compound is a particular complex of magnesium chloride and ethanol having the formula $MgCl_2 \cdot 3C_2H_5OH$.

5. A method for preparing a procatalyst of a catalyst system intended for the polymerization of olefins, in which a carrier based on a magnesium compound which is a particulate complex of magnesium chloride and an alcohol is brought into contact with titanium tetrachloride and a dialkylester of phthalic acid, characterized by using a dialkylester of phthalic acid which is a di-isodecyl phthalate and the molar ratio between the dialkylester of phthalic acid and magnesium is between 0.10 and 0.35.

6. A method according to claim 5, characterized in that the dielectricity constant of the dialkylester is below 5 measured at 25° C.

7. A method according to claim 5, wherein the alcohol is ethanol.

8. A method according to claim 5, wherein the particulate complex has the formula $MgCl_2 \cdot 3C_2H_5OH$.

* * * * *